United States Patent [19]

Oberle

[11] 4,299,291
[45] Nov. 10, 1981

[54] POWER HARROW WITH VERTICAL ROTATING ROTORS

[75] Inventor: Edmond Oberle, Saverne, France

[73] Assignee: Kuhn S.A., Saverne, France

[21] Appl. No.: 94,356

[22] Filed: Nov. 15, 1979

[30] Foreign Application Priority Data

Nov. 24, 1978 [FR] France .................. 78 33902

[51] Int. Cl.³ .......................................... A01B 33/06
[52] U.S. Cl. .................................... 172/49.5; 308/178
[58] Field of Search ................... 172/59, 111, 49, 125, 172/49.5; 301/36, 5 R; 308/178; 111/6, 7

[56] References Cited

U.S. PATENT DOCUMENTS

| 3,017,224 | 1/1962 | Palmer | 301/5 B |
| 4,043,401 | 8/1977 | Lely | 172/111 |
| 4,095,652 | 6/1978 | Lely | 172/47 |
| 4,124,078 | 11/1978 | Lely | 172/59 |
| 4,151,885 | 5/1979 | Lely | 172/59 |

FOREIGN PATENT DOCUMENTS

| 2847819 | 5/1979 | Fed. Rep. of Germany | 172/59 |
| 7608855 | 2/1977 | Netherlands | 172/59 |

Primary Examiner—Richard J. Johnson
Attorney, Agent, or Firm—Ernest F. Marmorek

[57] ABSTRACT

A power harrow has a frame that is normally substantially horizontal and at least one rotor. A rotatable shaft is journalled near one end in a bearing secured to the frame. The rotor is in driven connection with the other end of the shaft, and is rotated about a normally upright axis, so as to make contact with the soil to work it. A protective shield surrounds the bearing from below.

11 Claims, 4 Drawing Figures

POWER HARROW WITH VERTICAL ROTATING ROTORS

BACKGROUND OF THE INVENTION

The invention relates to soil-working machines and more particularly to power harrows carrying a plurality of rotors, which may be rotated about a bearing, such as a friction-resistant bearing; each rotor has a shaft secured thereto and is provided with a tool- or prong-holder, which holder is rotated about a normally vertical axis. The tools or prongs secured to the tool- or prong-holder extend substantially at right angles into the soil, and are used to break up the soil, particularly with a view of preparing the soil to receive seeds.

This type of harrow has the disadvantage that it is relatively easy for debris or vegetable matter to accumulate near the bearings of the rotatable shafts, at the end of which there are disposed the tool- or prong-holders. In practice, it has been shown that the accumulation of such debris, particularly remnants of tree branches and wheat stalks, for example mixed with soil or sand, act as abrasive particles, so that they damage the bearings, which bearings consequently must be replaced at a relatively substantial cost. Apart from the cost, there is also the risk that some vegetable matter, such as vines and the like, intrude into the mechanism and wrap themselves around the bearing or the shaft. This type of intrusion is very hazardous and may impair the motion of the friction-resistant devices, such as ball bearings or the like, incorporated in the bearings of these machines. These vines or other vegetable debris thus effectively reduce the life of any bearings in which the shaft or the prong- and tool-holders are journalled, which may in turn lead, as a result of damage to these bearings, to leakage of lubricating oil carried by the power harrow, and can in an extremecase result in the fracture of the friction-resistant bearings, such as ball bearings, or the like, as the result of introduction of foreign matter into these bearings.

It is therefore necessary to protect these bearings so that the power harrow can operate without there occurring any risk of damage to these machines.

Certain protective measures are known. It is known, for example, to provide along the length of the power harrow additional protective means, such as V-shaped covers. Although an arrangement of this type generally prevents the accumulation of any debris around the bearings, it nevertheless presents the risk of stones being jammed between the tool- or prong-holder and the cover. A jamming of this type may seriously impair the function of the harrow, so that the tool- or prong-holders may be damaged beyond repair. It is a further disadvantage of the cover protective device described that the mounting of the rotors equipped with such a protecting device is relatively complicated, thus takes a long time, and is therefore burdensome.

SUMMARY OF THE INVENTION

One of the principal objects of the invention is to remedy these disadvantageous features by providing for each rotor which extends downwardly of the power harrow a protecting means. Additionally, the invention permits particularly a simplification in the fabrication and mounting of these bearings, which in turn, reduces the net cost of the power harrow. Further objects and advantages of the invention will be set forth in part in the following specification and in part will be obvious therefrom without being specifically referred to, the same being realized and attained as pointed out in the claims hereof. With the above and other objects of the invention in view, the invention consists in the novel protection means or device, which includes a substantially cylindrical portion which extends around and shields the portion of each bearing which projects downwardly from the power harrow, and a collar of the protective device which abuts an outer portion the frame of the power harrow.

An arrangement of this type has numerous advantages. In effect, each bearing is protected by such a protection device, which is a simple and easily replaceable item and therefore not very costly. Each protective device is easily and individually interchangeable.

In order that each protection device does not easily catch any stones or other vegetable debris, its collar is made as smooth as possible.

The rotor of the power harrow is additionally protected by a part shielding the exterior of the bearing, such as a cover, which cover has a rim portion surrounding at least a portion of the bearing. This cover particularly protects the friction-resistant bearing means which are advantageously incorporated into each of the bearings, and also makes the bearings relatively water-tight and air-tight. Finally, the cover is a disposable item which can, for example, be easily replaced without any special tool.

BRIEF DESCRIPTION OF THE DRAWINGS

For a fuller understanding of the nature and objects of the present invention, reference should be had to the following detailed description, taken in conjunction with the accompanying drawing in which.

DESCRIPTION OF THE PREFERRED EMBODIMENTS

Figure 1:
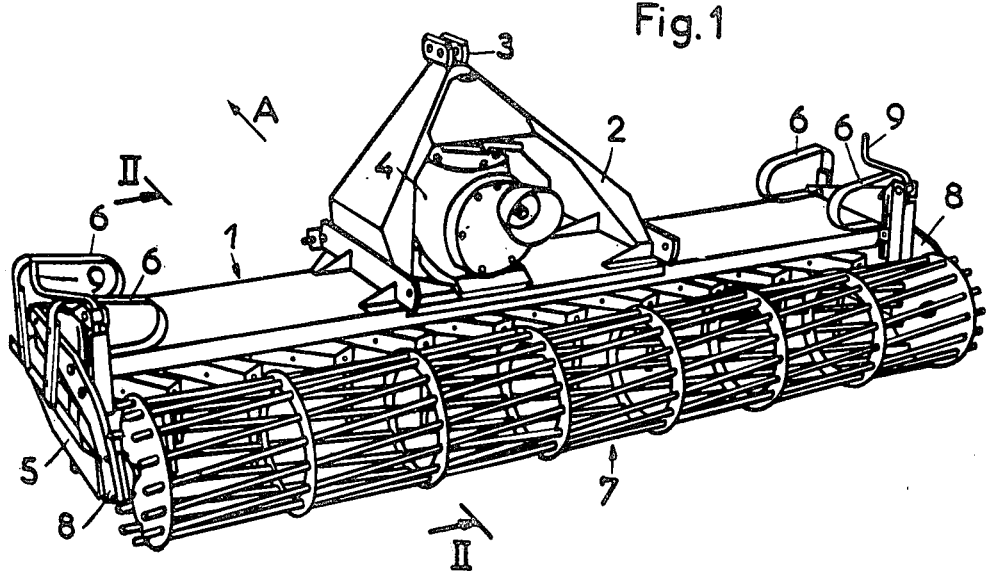
FIG. 1 is a perspective rear view of the power harrow, according to the present invention.

In carrying the invention into effect, and having reference to FIG. 1, rthere is provided a power-type harrow 41. This harrow 41 includes a frame 1 that extends substantially horizontally and at right angles to the direction of advancement A of the harrow 41. Secured to the frame 1 is a hitch frame 2 on which there is mounted a yoke 3 for being connected to a (non-illustrated) tractor. The harrow 41 is powered by a power device located in the tractor (not shown). The power of the tractor is transmitted to a gearbox 4 that is disposed within the hitch frame 2.

The harrow 41 is equipped on each longitudinal end with lateral deflectors 5, as best seen in FIG. 1, which are, in turn, maintained in place by plates 6. To the rear of the harrow 41 there is disposed a squirrel-cage-type roller 7. This roller 7 (FIG. 1) is connected to the harrow 41 by means of arms 8 that extend towards the front of the harrow 41 on each side thereof. In order to permit an operative adjustment of the depth to which the soil is to be worked, the height of the roller 7 with respect to the soil is adjustable. For this purpose, a control arrangement acting on the arms 8 and actuated by handles or cranks 9 is provided on each side of the harrow.

In order for the harrow 41 to work, break up and loosen the soil, there are provided rotor means 42, such as one or more rotors 43. Each rotor 43 includes a tool- or prong-carrying member 11, which has a side facing the soil substantially free of any projections which might entangle any soil or vegetable matter therebetween; a prong 10 is connected to each side of the member 11, for example, by means of a screw 12 and a nut 13. Each rotor 43 may be rotated about a normally upright axis.

Figure 2:
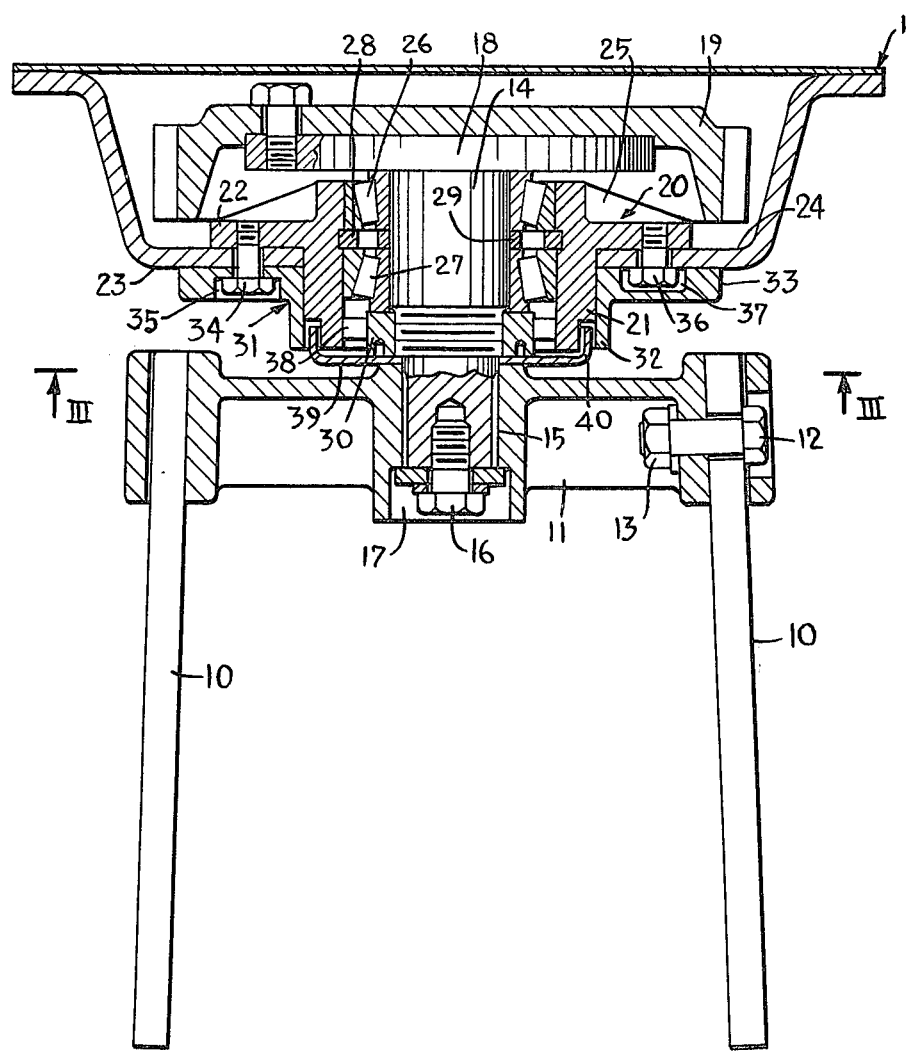
FIG. 2 is a sectional view of one of the rotors approximately along the lines II—II of FIG. 1.

A shaft 14 is secured in one version of the invention to the tool- or prong-holder 11. The tool- or prong-holder 11 may be integral with the shaft 14, or it may instead preferably be manufactured separately. In this alternate version, shown in FIG. 2, the shaft 14, which is rotatable, is provided on its lower side with a grooved portion 15, that cooperates with a complementary grooved bore in the tool- or prong-holder 11. A screw 16 is axially mounted at the bottom of the shaft 14; the head of the screw 16 preferably nestles within a recess 17 of the lower central portion of the tool- or prong-holder 11, and secures the tool- or prong-holder 11 to the shaft 14.

The tool- or prong-holder 11 may alternatively be secured to the shaft 14 by means of a (non-illustrated) pin. The shaft 14 extends with its top portion of the interior of a dished portion of the frame 1 of the harrow 41. On its top portion, the shaft 14 carries a flange 18. A gear drive, such as a gear wheel 19 is centrally disposed on top of the flange 18. This gear drive or gear wheel 19 constitutes the means by which each rotor of the harrow is engaged to a power device, provided, for example, in the (non-illustrated) tractor. The engagement of the gear wheel 19 to the power device of the tractor may be accomplished, for example, by a plurality of gear wheels 19 of the respective rotors 43, which mesh with one another; one of the gear wheels 19 engages the gearbox 4, and therethrough the power device of the tractor. Thus, each shaft 14 is in driven connection with each rotor so that each rotor is simultaneously made to rotate; each shaft 14 is journalled near one end with relation to the frame 1, and in turn carries the tool- or prong-carrying device 11. The gearbox 4, through which the power is transmitted to the shafts 14, is best seen in FIG. 1.

Each shaft 14 is journalled within bearing means, such as a bearing 20, which bearing 20 includes a cylindrical portion 21 and a lug 22.

Each bearing 20 is connected to a dished bottom or underside of the frame 1 in such a manner that its cylindrical portion extends below the dished bottom portion of the frame 1, so that the lug 22 of the bearing 20 abuts an internal face 24 of the dished portion of the frame 1. In order to reinforce the bearing 20, a plurality of ribs 25 disposed entirely within and above the dished portion of the frame 1 extend from a top portion of the lug 22 just up to a top region of the cylindrical portion 21 of the bearing 20.

The shaft 14 is guided within the interior of the cylindrical portion 21 of the bearing 20 by anti-friction means, such as preferably two truncated conical rollers 26 and 27. The top roller 26 borders with an upper portion thereof the flange 18, while it is bordered on a lower portion thereof by a partition 28 and a cross-piece 29. The lower roller 27 borders with its top portion the partition 28 and the cross-piece 29, and the rollers 26 and 27 are disposed above a nut 30, which nut 30 is secured onto the shaft 14. It will be understood that the mounting of the rollers 26 and 27 is shown only by way of example, as other implementations can serve equally well to jouurnal the shaft 14 in the bearing 20; at least a portion of the rollers 26 and 27 are preferably disposed below the frame 1.

The installation of the shaft 14 in its bearing 20 is particularly well engineered due to the fact that it can be installed or preassembled in the bearing 20 prior to the mounting of the bearing 20 itself on the frame 1. This preassembly of the shaft 14 and bearing 20 is particularly advantageous, as it facilitates the adjustment of the anti-friction bearings 26 and 27 in the bearing 20 prior to installation of the bearing 20 and the shaft 14 in the frame 1 of the harrow.

Once the shaft 14 has been installed in the bearing 20, the resultant assembly can be easily secured to the frame 1 in such a manner that the lug 22 of the bearing 20 abuts the internal surface 24 of the frame 1, so that the cylindrical portion 21 of the bearing 20 projects at least in part below the dished portion of the frame 1.

The pre-assembly of the shaft 14 in its bearing 20 has the additional advantage, that it is possible to stock such pre-assemblies, which facilitates replacement or repair of the harrow 41. Similarly, an operator can himself repair the harrow 41 without any special knowledge or any special tools, for the parts which are being replaced, namely the bearing 20 and its shaft 14, are preadjusted and therefore require no adjustment whatever in order to install them.

In order to protect and reinforce the bearing 20, its cylindrical portion 21 disposed below the frame 7 to a predetermined depth is surrounded by protective means, such as a shielding member 31 which also includes a cylindrical portion 32, which in turn surrounds the cylindrical portion 21 of the bearing 20 to a substantially predetermined depth. Furthermore, this shielding member 31 includes collar means, such as a collar 33, which abuts the external side 23 of the dished portion of the frame 1.

In order to secure the shielding member 31 and the bearing 20 to the frame 1 of the machine, connecting means, such as bolts or screws 34 are utilized, to thread the collar 33 of the shielding member 31 to the lug 22 of the bearing 20; the bolts or screws 34 then pass through a portion of the frame 1, namely through the outer side 23 of the dished portion of the frame 1, then pass the inner side 24 of that dished portion, and terminate within the lug 22 of the bearing 20. So that the bolt heads of the bolts 34 do not constitute any obstruction, and in order to prevent any stones or other debris from being caught in the device, the collar 33 is provided with recesses 35, within which the bolt heads of the bolts 34 nestle. The lower face of the collar 33 is therefore substantially smooth.

Figure 3:
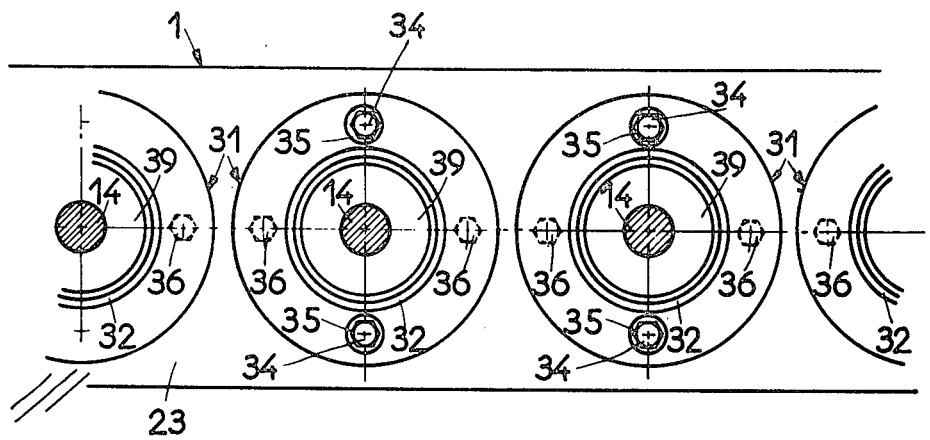
FIG. 3 is a plan view of the bottom of several rotors along the line III—III of FIG. 2, FIG. 3 being drawn to a smaller scale than FIG. 2.

As can be seen from FIG. 3, the shape of the collar 33 is preferably circular and has a different diameter, preferably a larger diameter, than the diameter of the lug 22 of the bearing 20. As a portion of the dished bottom of the frame 21 is wedged between the lug 22 and the collar 33, which lug 22 and collar 33 have different respective dimensions, a flat part of the dished portion of the frame 1 will therefore not be subjected to any shearing forces which might otherwise tear a circular hole into the dished portion of the frame 1 in the case any exceptionally severe stresses are encountered by the harrow 41.

Figure 4:
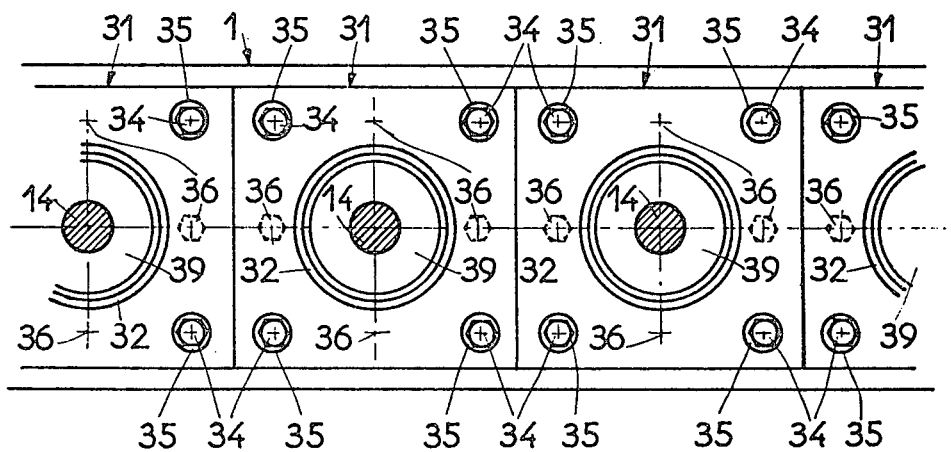
FIG. 4 is a plan view similar to FIG. 3, but embodying an alternate version.

The shape of the collar 33 may alternatively be rectangular, as can be seen from FIG. 4. Since, when a plurality of rotors 43 are installed in the harrow 41, corresponding shields 31 will be adjacent, the collars 33 of adjacent shields 31 may be joined, which has the advantage of providing a frame 1 which has a uniform bottom thickness, which arrangement also enhances the rigidity of frame 1.

As each shield 31 completely encircles the cylindrical portion 21 of a corresponding portion of the bearing 20, which projects below the frame 1, the shield or protective device 31 which in operation encounters shocks and is subject to wear, can be easily replaced individually and independently of any neighboring or adjacent shield 31. For this purpose, it is sufficient to unscrew the screws 34 which are accessible from the exterior, and which maintain the bearing 20 secured to the dished portion of the frame 1. With the bolts or screws 34 being removed, the shield 31 is easily removed, so that it can be replaced by a new one. If only the bolts or screws 34 were to be utilized, this could be somewhat inconvenient, as in such an event the bearing 20 would no longer be secured to the dished portion of the frame 1.

Accordingly, in another version of the present invention, only two screws or bolts 34 are preferably utilized. Additional connecting means, such as screws or bolts 36 preferably secure the dished portion of the frame 1 to the lug 22 of the bearing 20. The bolt heads 36 of the screws 34 nestle in recesses 37 of the collar 33, and are therefore protected from any damage. Furthermore, it is sufficient to remove the two bolts or screws 34, in order to individually replace each shield 31 without the necessity to dismantle the bearing 20 which remains connected to the dished portion of the frame 1, even after the shield 31 has been removed: the bearing 20, may of course, be removed separately from the harrow 41 after the shield 31 has been removed.

It will be clear that the number of screws 34 may be greater than two, but the number of the screws 36 which abut the lower face 23 of the dished portion of the frame 1 should preferably be at least equal to the number of screws or bolts 34, each head of which nestles in a recess 35 of the collar 33 of the shield 31.

The conically-shaped rollers 26 and 27 are protected by a ring-shaped member 38 disposed in a lower portion of the bearing 20, which ring-shaped member 38 abuts a nut 30. The ring-shaped member 38 is itself preferably protected by a cover 39 which may, for example, be made of sheet iron, and which is centered around the shaft 14. A bent rim portion 40 of the cover 39 is disposed between the bearing 20 and the shield 31. This arrangement acts like a baffle, protecting the ring-shaped member 38 and the conically-shaped rollers 26 and 27 from any introduction of foreign matter into the bearing 20. The cover 39, being subject to wear, can also be replaced easily by simply detaching the tool- or prong-carrying member 11 from the shaft 14.

The cover 39 can alternatively be provided with a (non-illustrated) second rim portion radially extending beyond the rim portion 40, and surrounding the shield 31, thus resulting in a superior protection arrangement.

The operation of the harrow, according to the invention, will easily be understood by anyone skilled in the art. The harrow 41 is driven in the direction of advancement, as shown by the arrow A in FIG. 1. The rotors 43 reduce even the hardest soil clods to a relatively fine tilth in one pass of the harrow, at the same time keeping the topsoil on the surface.

The rotors are directly followed by the squirrel-cage type roller 7, which not only packs the tilth evenly, but controls harrowing depth.

The result is an ideal seedbed which has perfect porosity to aid both ventilation as well as water circulation, and allows soil temperature to be maintained at maximum.

I wish it to be understood that I do not desire to be limited to the exact details of both the preferred construction shown and described, presenting the best mode of operation of the harrow, as well as of the alternate version discussed, for obvious modifications will occur to a person skilled in the art.

Having thus described the invention, what I claim is as follows:

1. Bearing support means and protective means therefor, for use in connection with a power harrow that includes a frame and rotor means, including a plurality of adjacent individual rotors, each rotor comprising in combination:
   a rotatable shaft journalled in relation to said bearing support means and adapted to be secured with one end thereof to said rotor means for driving them,
   said protective means being supported from said bearing support means, but separate therefrom, and including collar means adapted to abut a portion of said frame, and a part shielding the exterior of said bearing means,
   said bearing support means including anti-friction means, a cylindrical portion of said bearing support means fitting into said collar means, and
   connecting means securing said collar means to said bearing support means, and being adapted to connect said collar means and said bearing support means to said frame, whereby said protective means is dismantlable from said bearing support means without disturbing said bearing means, and without disturbing the protective means of an adjacent rotor.

2. Bearing support means and protective means for a power harrow rotor as claimed in claim 1, wherein said bearing support means extends to a predetermined depth outside of said frame, said protective means extending substantially to said predetermined depth.

3. Bearing support means and protective means for a power harrow rotor as claimed in claim 1, wherein said collar means is substantially cylindrical.

4. Bearing support means and protective means for a power harrow rotor as claimed in claim 1, wherein said collar means is substantially rectangular.

5. Bearing support means and protective means for a power harrow rotor as claimed in claim 4, wherein the collar means of adjacent protective means are joined.

6. Bearing support means and protective means for a power harrow rotor as claimed in claim 1, wherein said bearing support means includes an external lug having outer dimensions different from the outer dimensions of said collar means.

7. Bearing support means and protective means for a power harrow rotor as claimed in claim 6, wherein the dimensions of said collar means exceed the dimensions of said lug.

8. Bearing support means and protective means for a power harrow rotor as claimed in claim 6, wherein said connecting means secure said lug to said collar means and to said frame.

9. Bearing support means and protective means for a power harrow rotor as claimed in claim 8, wherein said collar means has a plurality of inwardly facing recesses, and a plurality of outwardly facing recesses, and wherein said connecting means includes a plurality of first and second bolts, for securing said lug to said collar means and to said frame, respectively each of said pluralities of bolts nestling in said outwardly facing recesses, and the bolt heads of said second plurality of bolts nestling in said inwardly facing recesses.

10. Bearing support means and protective means for a power harrow rotor as claimed in claim 9, wherein said plurality of outwardly facing recesses is at least equal to said plurality of inwardly facing recesses.

11. Bearing support means and protective means for a power harrow rotor as claimed in claim 1, wherein said protective means further comprise a cover disposed on said shaft and including a rim portion located between said part of said protective means shielding the exterior of said bearing support means and at least a part of said bearing support means.

* * * * *